United States Patent [19]

Yuasa

[11] Patent Number: 4,757,332

[45] Date of Patent: Jul. 12, 1988

[54] OPTICALLY IMAGED RECORDING APPARATUS

[75] Inventor: Kazuhiro Yuasa, Zama, Japan

[73] Assignee: Ricoh Company, Ltd., Tokyo, Japan

[21] Appl. No.: 883,501

[22] Filed: Jul. 8, 1986

[30] Foreign Application Priority Data

Jul. 8, 1985 [JP] Japan ............................... 60-148315

[51] Int. Cl.[4] ...................... G01D 15/14; G03G 15/00

[52] U.S. Cl. .................................. 346/160; 355/3 BE

[58] Field of Search .................. 355/1, 3 R, 3 BE, 16; 346/153.1, 160

[56] References Cited

U.S. PATENT DOCUMENTS

| | | | |
|---|---|---|---|
| 3,515,880 | 6/1970 | Letter | 346/160 X |
| 4,545,669 | 10/1985 | Hays et al. | 355/3 R |
| 4,547,787 | 10/1985 | Kaneko et al. | 346/160 |
| 4,637,708 | 1/1987 | Yuasa | 355/3 BE X |

*Primary Examiner*—Fred L. Braun
*Attorney, Agent, or Firm*—Oblon, Fisher, Spivak, McClelland & Maier

[57] ABSTRACT

A recording apparatus for forming a toner image with simultaneous application of a light image and toner is provided. An endless imaging belt includes a transparent substrate, an inner conductive layer formed on the substrate, a photoconductive layer formed on the inner layer, an outer conductive layer formed on the photoconductive layer, and a surface layer formed on the outer conductive layer. With a positive bias applied to the outer conductive layer and a negative bias to the inner conductive layer, a light image is applied to the imaging member from the transparent substrate side and at the same time a film of positively charged toner is applied to the opposite side of the imaging member, so that a toner image is directly formed on the imaging member by selective deposition of toner according to a light pattern of the light image.

7 Claims, 3 Drawing Sheets

OPTICALLY IMAGED RECORDING APPARATUS

BACKGROUND OF THE INVENTION

1. Field of the Invention

This invention generally relates to a recording apparatus suitable for use as an output device of various machines, such as facsimiles, computers, copiers, printer, and plotters, and, in particular, to a recording apparatus using an optical imaging technique to form a toner image.

2. Description of the Prior Art

A multi-stylus recording system using a number of styli arranged in the form of an array is well known in the art. In this system, an image may be directly formed on an imaging member which is typically comprised of an electrically insulating material. However, the voltage selectively applied to the styli is relatively high and thus a driving system for applying a driving voltage to the styli tends to be bulky and expensive. Moreover, the number of styli must be increased if a higher resolution is desired; however there is a limit in the number of styli to be arranged in an array because of physical strength required for the styli and it also brings about difficulty in manufacture.

SUMMARY OF THE INVENTION

It is therefore a primary object of the present invention to obviate the disadvantages of the prior art as described above and to provide a novel recording apparatus capable of forming a toner image with selective light irradiation.

Another object of the present invention is to provide a novel recording apparatus using an optical imaging technique simple in structure and thus easy and inexpensive to manufacture.

A further object of the present invention is to provide a recording apparatus virtually free of maintenance and capable of forming an image of high quality.

A still further object of the present invention is to provide a recording apparatus fast and reliable in operation.

Other objects, advantages and novel features of the present invention will become apparent from the following detailed description of the invention when considered in conjunction with the accompanying drawings.

DESCRIPTION OF THE PREFERRED EMBODIMENTS

Figure 1:
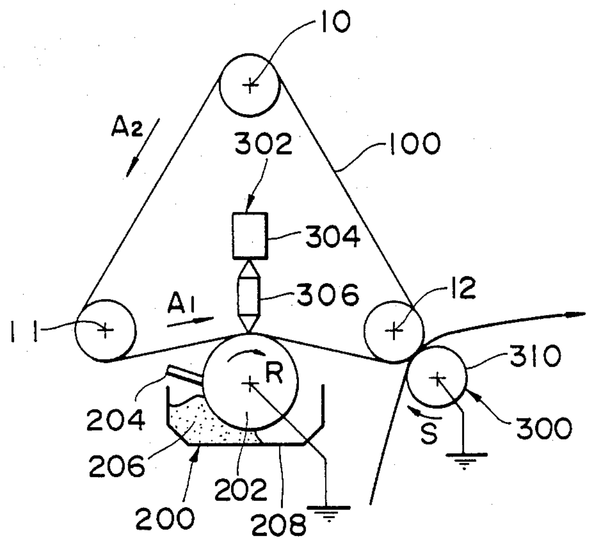
FIG. 1 is a schematic illustration showing the overall structure of a recording apparatus constructed in accordance with one embodiment of the present invention.

Referring now to FIG. 1, there is schematically shown a recording apparatus constructed in accordance with one embodiment of the present invention. As shown, the illustrated recording apparatus includes an imaging belt 100 in an endless format which is supported by three rollers 10, 11 and 12 to run along a predetermined path. Typically, at least one of the rollers 10, 11 and 12 is driven to rotate, for example, by a motor (not shown), so that the imaging belt 100 normally travels at constant speed in the direction indicated by arrows A1 and A2.

Figure 2:
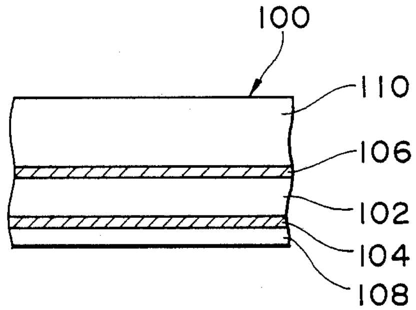
FIG. 2 is a schematic illustration showing in cross section the structure of the imaging belt 100 provided in the apparatus shown in FIG. 1.

As shown in cross section in FIG. 2, the imaging belt 100 in the illustrated embodiment has a multi-layer structure and it includes a photoconductive layer 102 containing a photoconductive material, an inner electrically conductive layer 104 formed on an inner surface of the photoconductive layer 102, an outer electrically conductive layer 106 formed on an outer surface of the photoconductive layer 102, a surface layer 108 formed on the inner conductive layer 104 and containing an electrically insulating material, and a transparent substrate 110 formed on the outer conductive layer 106. Preferably, the surface layer 108 is formed as thin as possible so as to allow the bias voltages to be applied to the conductive layers 104 and 106 to be lowered and to obtain an enhanced toner attracting characteristic. The transparent substrate 110 provides not only physical strength, but also a protection to the outer conductive layer 106. The outer conductive layer 106 is preferably comprised of a transparent and electrically conductive material, such as ITO. For a combination of the transparent substrate 110 and the outer conductive layer 106, use may be preferably made of a product available under the name of "HIBEAM" from Toray Kabushiki Kaisha, Japan.

The photoconductive layer 102 preferably has a dark resistivity which is significantly larger than a light resistivity and also a fast light response speed. Moreover, the material for the photoconductive layer 102 should be so selected that its photosensitive characteristic matches with the wavelength of light to be used in imaging as will be described later. In the preferred embodiment of the present invention, the inner conductive layer 104 has a resistance Rc1 to ground which is larger than a resistance Rc2 to ground of the outer conductive layer 106. That is, among resistance Rc1 of the inner conductive layer 104, resistance Rc2 of the outer conductive layer 106, and dark resistance RmD and light resistance RmL of the photoconductive layer 102, there preferably exists a relation of Rc1 being significantly smaller than RmD but significantly larger than RmL and RmL being larger than or approximately equal to Rc2.

Figure 3:
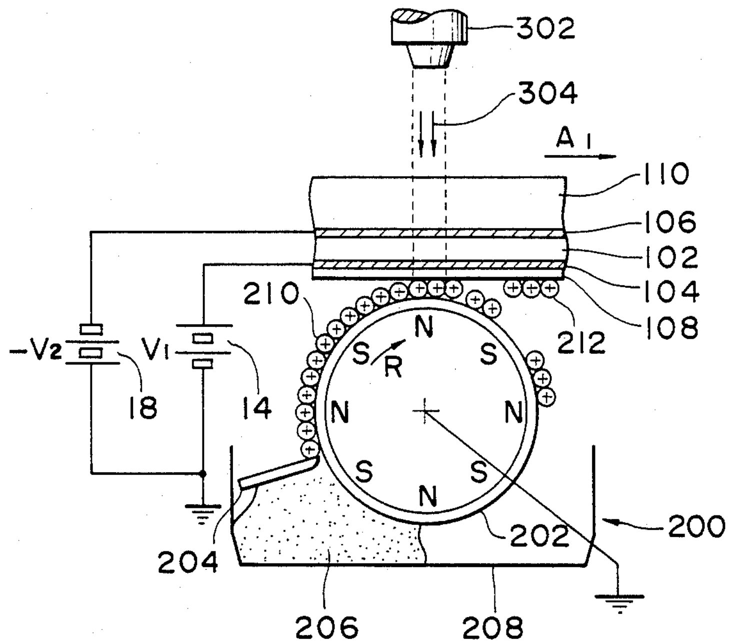
FIG. 3 is a schematic illustration showing an image forming station of the apparatus shown in FIG. 1.

It should be noted that suitable electrical means, such as electrically conductive brush, is provided to apply a suitable bias voltage of selected polarity to the inner conductive layer 104 of the imaging member 100, though such means is not shown specifically. In the illustrated embodiment, as shown in FIG. 3, a positive bias voltage V1 is applied to the inner conductive layer 104 from a first voltage source 14. Similarly, a suitable voltage of selected polarity is also applied to the outer conductive layer 106, for example, by providing electrically conductive brush in sliding contact with the outer conductive layer 106 of the imaging member 100. In the illustrated embodiment, a negative voltage of $-$V2 is applied to the outer conductive layer 106 from a second voltage source 18 as shown in FIG. 3.

As shown in FIG. 1, a toner supplying device 200 is disposed at the outer side of the endless imaging belt 100. As best shown in FIG. 3, the toner supplying device 200 includes a roller 202 which is driven to rotate in the direction indicated by the arrow R at constant speed in rolling contact with the outer surface of the imaging belt 100. The roller 202 is magnetized along its peripheral surface in alternate polarities as shown in FIG. 3 and is grounded. The toner supplying device 200 also includes a container 208 for containing therein a quantity of toner 206 and a doctor blade 204 which is fixedly mounted on the container 208 with its tip end in pressure contact with the peripheral surface of the roller 202. Preferably, the toner 206 contains a magnetic material and is high in resistivity. In the illustrated embodiment, the toner 206 is so selected that it is triboelectrically charged to positive polarity due to friction against the blade 204 and/or roller 202. As a result, as the roller 202 rotates in the direction indicated by the arrow R, the toner 206 becomes triboelectrically charged to positive polarity and a thin film 210 on the order of several tens of microns in thickness is formed on the peripheral surface of the roller 202 from positively charged toner particles.

As shown in FIG. 3, at the side opposite to the side where the toner supplying device 200 is disposed with respect to the imaging belt 100 is disposed an image exposure device 302. As shown in FIG. 1, the image exposing device 302 is preferably comprised of a light source 304 and an optical system 306. In the preferred embodiment, the light source 302 includes a plurality of light emitting elements arranged in the form of a single array extending across the width of the imaging member 100. Alternatively, the light source 304 may be of the scanning type capable of scanning a light beam over the width of the imaging member 100. In the preferred embodiment, an array of light emitting diodes or laser is used for the light source 304. These elements are advantageous because they have an inherent self switching function, which can be advantageously used in line scanning. As an alternative structure, use may be made of an element, such as LCS, which emits light constantly and a light transmission control element having an optical shutter function, such as liquid crystal or electrooptical effect element like PLZT, for controlling the transmission of constantly emitted light.

In the case where the present invention is applied to a copier, the image exposing device 302 is so structured that light reflecting from an original document is scanned across the width of the imaging member 100 repetitively, for example, by using a plurality of optical fibers. On the other hand, in the case where the present invention is applied to an output unit of a data processing system, such as a computer, the light to be applied to the imaging member 100 is modulated by an output signal of the data processing system, thereby applying an light image to the imaging member 100.

Figure 4:
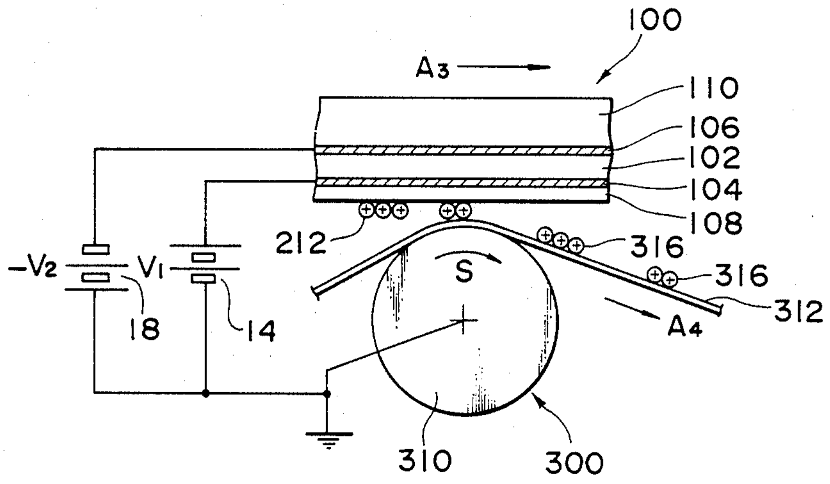
FIG. 4 is a schematic illustration showing an image transfer station of the apparatus shown in FIG. 1.

As shown in FIG. 1, downstream of the toner supplying device 200 with respect to the direction of travel of the imaging belt member 100 is disposed an image transfer device 300. As best shown in FIG. 4, the image transfer device 300 includes a counter roller 310 which is disposed at the side opposite of the roller 12 with respect to the imaging member 100 and which is driven to rotate in the direction indicated by the arrow S. In the illustrated embodiment, the counter roller 310 is grounded. A recording medium 312, preferably plain paper, is interposed between the imaging member 100 and the counter roller 310 and it travels in the direction indicated by the arrow A4 at a speed substantially the same as that of the imaging member 100 travelling in the direction indicated by the arrow A3 in FIG. 4. In the illustrated embodiment, the counter roller 310 is so disposed that the surface of the recording medium 312 comes very close to the outer surface of the imaging member 100 when passing around the counter roller 310. Thus, in the illustrated embodiment, a predetermined gap is present between the recording medium 312 and the imaging member 100.

In operation, the imaging belt member 100 travels in the direction indicated by the arrow A1 at constant speed, and as the roller 202 rotates in the direction indicated by the arrow R, there is formed a thin film 210 of positively charged toner on the peripheral surface of the roller 202, which is then brought into contact with the outer or imaging surface of the imaging member 100. At the same time, as shown in FIG. 3, light containing image information is applied to the imaging member 100 from the image exposing device 302.

Figure 5:
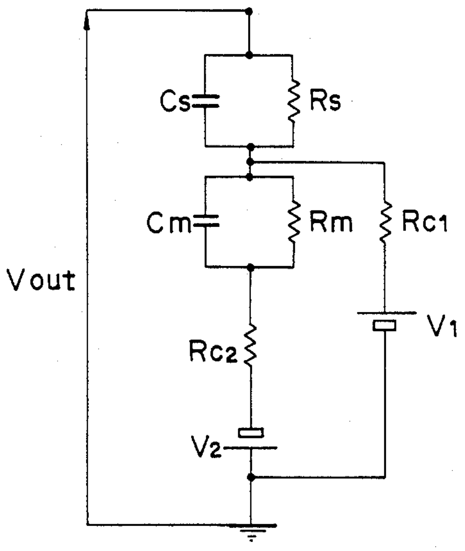
FIG. 5 is a circuit diagram showing an electrical equivalent circuit of the image forming station shown in FIG. 3.

Now, designating the electrical resistance of the inner conductive layer 104 to ground by Rc1, electrical resistance of the outer conductive layer 106 to ground by Rc2, electrical resistance and capacitance of the photoconductive layer 102 by Rm and Cm, respectively, electrical resistance and capacitance of the surface layer 108 by Rs and Cs, respectively, and voltage between the surface layer 108 and roller 202 by Vout, we can obtain an equivalent circuit for the structure of FIG. 3 as shown in FIG. 5. Thus, the voltage difference between the surface layer 108 and the roller 202 may be expressed by the following equation.

$$\mathrm{Vout}=((Rm+Rc2)V1-Rc1\cdot V2)/(Rc1+Rm+Rc2)$$

It is to be noted that Rm should be added with D, such as RmD, for a dark place and with L, such as RmL, for a light place. And, in the preferred embodiment, since the relation of Rc1 being significantly smaller than RmD but significantly larger than RmL and RmL being larger than Rc2 or substantially equal to Rc2 holds, for Vout in a dark place, i.e., VoutD, we have the relation of VoutD=V1; on the other hand, for Vout in a light place, i.e., VoutL, we have the relation of VoutL=−V2.

Accordingly, for those portions which are not irradiated by the light from the image exposing device 302, the voltage difference VoutD between the surface layer 108 and the roller 202 becomes V1, so that due to an electric field created by this votage difference VoutD, the thin layer 210 of positively charged toner formed on the roller 202 is electrostatically repelled by the imaging member 100, and, thus, no toner is attracted to the unexposed portions of the imaging member 100. On the other hand, for those portions to which light from the image exposing device 302 are irradiated, the voltage difference VoutL between the surface layer 108 and the roller 202 becomes −V2. Thus, due to an electric field formed by this voltage difference VoutL, the positively charged toner defining the layer 210 on the roller 202 is selectively attracted to those portions of the imaging member 100 which are exposed, thereby forming a toner image 212 on the surface of the imaging member 100. In this manner, in accordance with the illustrated embodiment of the present invention, the toner is selectively deposited to those portions of the imaging member 100 which are exposed to light from the image exposing device 302, and, thus, the toner image 212 is formed on the imaging member 100 according to the light pattern defining a light image applied by the image exposing device 302.

The toner which has not been transferred to the imaging member 100 remains on the roller 202 and it is brought back to the toner 206 stored in the container 208. And, as the roller 202 further rotates, the residual toner is mixed with the toner 206 stored in the container 208 and a new layer 210 of charged toner is formed on the roller 202 by means of the doctor blade 204. On the other hand, the toner image 212 formed on the imaging member 100 moves in the direction indicated by the arrow A1 to the image transfer device 300, where the toner image 212 formed on the imaging member 100 is transferred to the recording medium 312 due to an electric field corresponding to the voltage difference VoutD (=V1) which is formed between the counter roller 310 and the surface layer 108 of the imaging member 100 in a dark place, thereby forming a transferred toner image 316 on the recording medium. The transferred toner image 316 is then passed through a fixing device (not shown) to have it semipermanently fixed to the recording medium 312.

The toner image 212 on the imaging member 100 is not entirely transferred to the recording medium 312 at the image transfer device 300, and part of the toner image 212 remains on the imaging member 100 after passing through the image transfer station 300. And, such residual toner on the imaging member 100 is again passed though an imaging station defined between the toner supplying device 200 and the image exposing device 302 as the imaging member 100 travels in cycle. Thus, that portion of the residual toner on the imaging member which is exposed this time will remain on the imaging member; whereas, that portion of the residual toner which is not exposed this time will be retransferred to the roller 202 to be returned to the container 208. Thus, in the illustrated embodiment, there is no need to provide a cleaning unit to remove the residual toner from the imaging member 100 before it is presented for reuse.

Figure 6:
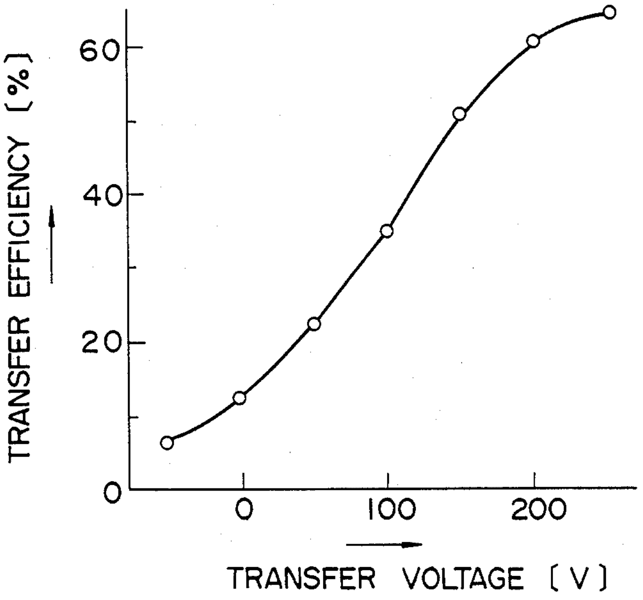
FIG. 6 is a graph showing the performance of the image transfer station depending on the voltage applied to the conductive layer 104 of the imaging belt 100.

As described above, the transfer of toner from the imaging member 100 to the recording medium 312 at the image transfer station 300 takes place due to an electric field formed by the voltage difference VoutD (=V1) present between the counter roller 310 and the surface layer 108 of the imaging member 100 in a dark place condition, and, thus, the image transfer efficiency varies depending on the level of the voltage V1 applied to the inner conductive layer 104 of the imaging member 100. FIG. 6 shows how the image transfer efficiency varies as a function of the voltage V1 applied to the inner conductive layer 104. As may be seen from the graph of FIG. 6, the transfer efficiency of 60% can be obtained if the voltage V1 is set at 200V.

As described above, in accordance with the above-described embodiment of the present invention, there is no need to provide a high voltage driving circuit for driving each pixel as in the case of the prior art multi-stylus system. Besides, there is no need to provide a cleaning unit for cleaning residual toner. Accordingly, the recording apparatus according to the present invention is simplified in structure and compact in size. Maintenance requirement is significantly reduced, and, since no corona device is used, no ozone generating source is present, which is advantageous because possible attack of the photoconductive layer by ozone can be eliminated. Furthermore, since formation of a toner image is effected by simultaneous application of image exposure and toner, it is less likely that toner is deposited on the background area, which would also contribute to prevent the occurrence of background contamination when the toner image 212 is transferred to the recording medium 312 at the image transfer station 300.

While the above provides a full and complete disclosure of the preferred embodiment of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. Apparatus for forming a toner image with simultaneous application of image exposure and toner, comprising:

imaging member having a first surface for forming a toner image thereon and a second surface at an opposite side of said first surface, said imaging member travelling along a predetermined path and including a transparent substrate, a first electrically conductive layer formed on said substrate, a photoconductive layer formed on said first conductive layer, a second electrically conductive layer formed on said photoconductive layer, and a surface layer formed on said second conductive layer, whereby an exposed surface of said substrate defines said second surface and an exposed surface of said surface layer defines said first surface;

toner supplying means for supplying toner charged to a predetermined polarity to said first surface of said imaging member; and exposing means located opposite to said toner supplying means with said imaging member sandwiched therebetween for exposing a light image to said imaging member at a location where said toner is supplied thereto by said toner supplying means from said second surface, whereby said toner is selectively deposited to said first surface of said imaging member in accordance with a light pattern of said light image.

2. Apparatus of claim 1 further comprising means for applying a first bias voltage to said first conductive layer and a second bias voltage to said second conductive layer.

3. Apparatus of claim 2 wherein said first and second bias voltages are opposite in polarity.

4. Apparatus of claim 3 wherein the polarity of said second bias voltage is the same as that of the charge of said toner.

5. Apparatus of claim 4 wherein, designating resistances in dark and light places of said photoconductive layer by RmD and RmL, respectively, and a resistance to ground of said second conductive layer by Rc1, and a resistance to ground of said first conductive layer by Rc2, there holds a relation of Rc1 being significantly smaller than RmD but significantly larger than RmL and RmL being larger than or substantially equal to Rc2.

6. Apparatus of claim 1 further comprising transferring means for transferring said toner image formed on said imaging member to a recording medium.

7. Apparatus of claim 6 wherein said imaging member is formed in an endless shape and extended around a plurality of rollers.

* * * * *